(12) United States Patent
Ray et al.

(10) Patent No.: US 6,536,665 B1
(45) Date of Patent: *Mar. 25, 2003

(54) METHOD AND APPARATUS FOR TRANSACTION CARD SECURITY UTILIZING EMBEDDED IMAGE DATA

(75) Inventors: Lawrence A. Ray, Rochester, NY (US); Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,425

(22) Filed: Jan. 20, 2000

Related U.S. Application Data

(63) Continuation-in-part of application No. 09/218,614, filed on Dec. 22, 1998, now Pat. No. 6,321,981.

(51) Int. Cl.$^7$ .................................................. G06K 5/00
(52) U.S. Cl. ........................ 235/380; 235/379; 235/382; 235/435
(58) Field of Search ................... 235/380, 379, 235/382, 435; 382/115, 110; 380/4

(56) References Cited

U.S. PATENT DOCUMENTS

| | | | | |
|---|---|---|---|---|
| 5,436,970 A | * | 7/1995 | Ray et al. ..................... 380/23 |
| 5,466,918 A | * | 11/1995 | Ray et al. ..................... 235/380 |
| 5,710,834 A | * | 1/1998 | Rhoads ........................ 382/232 |
| 5,841,886 A | * | 11/1998 | Rhoads ........................ 832/115 |
| 5,864,622 A | * | 1/1999 | Marcus ................... 235/379 X |
| 6,044,156 A | * | 3/2000 | Honsinger et al. ............ 380/54 |
| 6,044,182 A | * | 3/2000 | Daly et al. ................... 382/284 |
| 6,049,627 A | * | 4/2000 | Becker et al. ............... 382/181 |
| 6,101,602 A | * | 8/2000 | Fridrich ....................... 713/176 |
| 6,122,403 A | * | 9/2000 | Rhoads ........................ 382/233 |
| 6,135,355 A | * | 10/2000 | Han et al. .................... 235/493 |
| 6,226,429 B1 | * | 5/2001 | Lord et al. ..................... 385/49 |
| 6,286,100 B1 | * | 9/2001 | Morimoto et al. .......... 713/176 |
| 6,286,761 B1 | * | 9/2001 | Wen ............................ 235/486 |
| 6,321,981 B1 | * | 11/2001 | Ray et al. .................... 235/380 |

FOREIGN PATENT DOCUMENTS

| | | |
|---|---|---|
| EP | 0 469 864 A2 | 2/1992 |
| EP | 0 599 558 A2 | 6/1994 |
| EP | 0730242 A2 * | 4/1996 |
| EP | 0 851 397 A2 | 7/1998 |
| JP | 03 185585 A | 11/1991 |
| JP | 02000200337 A * | 7/2000 |
| WO | WO 94/19770 A | 9/1994 |

* cited by examiner

Primary Examiner—Thien M. Le
Assistant Examiner—Daniel Walsh
(74) Attorney, Agent, or Firm—Mark G. Bocchetti

(57) ABSTRACT

A highly secure personal identification badge is achieved by having an area which contains machine readable information and also having a printed region having embedded data in the image printed thereon. A method of producing the identification badge, includes the steps of: forming a digital image of the badge holder; generating an array of random numbers using a random number generator that employs a seed value; adding the array of random numbers to the digital image to produce a modified digital image; and printing the modified digital image on the identification badge. The badge is authenticated by scanning the image on the identification badge to produce a recovered digital image; and correlating the array of random numbers with the recovered digital image to produce a validity check of the identification badge.

6 Claims, 4 Drawing Sheets

METHOD AND APPARATUS FOR TRANSACTION CARD SECURITY UTILIZING EMBEDDED IMAGE DATA

CROSS REFERENCED TO RELATED APPLICATIONS

This is a continuation-in-part of application Ser. No. 09/218,614, filed Dec. 22, 1998, entitled "METHOD AND APPARATUS FOR TRANSACTION CARD SECURITY UTILIZING EMBEDDED IMAGE DATA," now U.S. Pat. No. 6,321,981 by Lawrence A. Ray and Chris W. Honsinger.

FIELD OF THE INVENTION

The current invention is in the field of personal identification related document technology and in particular to the field of transaction card security and imaging on transaction cards and other personal identification related documents.

BACKGROUND OF THE INVENTION

A wide range of documents require personalization. Some examples are passports, transaction cards, entry passes and drivers licenses. The main purpose of the personalization is to accord the holder some privilege and to prevent others from having access to the privilege. As a result these documents usually have a means of personal identification included into the document. This wide range of documents will be referred to in the following as personal identification related documents. In the following we adopt the term transaction card to embrace all personal identification related documents and vice versa.

The use of transaction cards is ubiquitous and offers cardholders access to financial resources as well as many services. In many situations transaction cards have become a replacement for currency and are attractive targets for fraudulent use. In order to protect financial institutions, consumers, and merchants from fraudulent use of these cards, the credit card industry has introduced many features onto cards to reduce fraud. Included in this list of features are the magnetic stripe, holograms, special over-layers, card verification values and the like. Since those interested in committing credit card fraud are looking for means to circumvent the security features there is a continual need for new technologies to thwart their attempts.

Transaction cards typically come with a data storage area that is accessed by a machine. A typical example of this is the magnetic stripe common on most credit cards. However, other data storage means are available, such as a small microprocessor in the case of so-called smart-cards. In any case, the purpose of this data storage is an electronic means for the equipment at the point of transaction to gather information about the account being serviced. In the case of standard credit cards information on the storage area includes the account number, name of authorized cardholder and expiration date.

Equipment used in conjunction with transaction cards have advanced technically. It is common for a cash register to include a microprocessor having computing power compatible with common home computer systems. These systems often are networked for interactions with larger store systems and financial networks. Automated Teller Machines (ATM's) are also technically sophisticated and are typically networked to a world-wide financial system.

One feature common to most ATM machines is that the transaction card is captured completely by the machine. Common transaction terminals, such as those produced by vendors such as Verifone, often only read the magnetic stripe as the card is swiped through the device.

Other methods of machine readable data onto cards include so-called smart-cards manufactured and marketed by GemPlus among others, two-dimensional bar-codes such as those marketed by Symbol Technologies, Inc., and data glyphs marketed by Sandia Imaging. All of these methods store a limited amount of machine readable data onto a transaction card and are being utilized by different issuers of transaction cards.

Methods for printing onto transaction cards are well-known. The printing of transaction cards which have unique or small quantities is also done by commercially available systems such as the ImageCard IV Photo ID Printer from Datacard. These printers allow for digital images to be printed directly onto a PVC material.

Transaction card issuers have been adding images of cardholders onto the card for several years. This image provides some security since presenting a card with someone else's picture will cause one to question whether the card's use is legitimate. An extension of this idea is for the cardholder's picture to be compressed and stored into the data storage of the card. A method for capturing, storing and compressing a cardholders portrait onto the magnetic stripe of the computer has been developed (see U.S. Pat. No. 5,466,918, Nov. 14, 1995 to Ray, et al., entitled "METHOD AND APPARATUS FOR IMAGE COMPRESSION, STORAGE, AND RETRIEVAL ON MAGNETIC TRANSACTION CARDS"), which is hereby incorporated herein by reference.

Image scanning is a common practice and the equipment to accomplish this task has become both inexpensive and relatively compact. Typically, the scanning can be done with a resolution of 500 dots per inch (dpi) and in color. The scanning process is also quite fast, scanning a full page in a matter of seconds.

Often there is a need to distill a relatively large data record into a shorter reference value or key. What is desirable is to create the key from the data, but with a negligible likelihood of the same key being generated from two distinct records. Often these methods are referred to as hash algorithms and they are utilized widely in computer systems. A well-known such hash algorithm is the so-called Secure Hash Algorithm (SHA) of National Institute of Standards and Technology (NIST). This algorithm processes a 512 bit record into a 160-bit (20-byte) key. Mathematically, a hash function is a mapping from the space of m-bit strings to the space of n-bit strings where $m>n$. For instance if $m=512$ and $n=160$, then the SHA is such a mapping, but so is the mapping which simply truncates the string after the first 160 bits.

A method for securing images is data hiding or embedding where information is encoded into an image in such a manner that makes it invisible to a viewer, but becomes readable by means of an imager scanner and an image processing device. To be practical, however, the hidden information must be rapidly recoverable from the scanned data and must be able to survive the printing process and the effects of wear such as scratching. Furthermore, to relate the hidden information to other information on the card, the hidden data must have the ability to carry information. For example, if the hidden information only carried one bit of data, then the maximum number of names that the hidden information could address would be two. If however, the hidden information could successfully carry 32 bits of information, then a maximum of about 10 billion people could be addressed. Of course, these calculations assume that a data base relating a name to a raw bit sequence is used.

Several algorithms exist today that possess this level of robustness and information carrying capacity. For example, (see U.S. Pat. No. 5,636,292, Jun. 3, 1997 to Rhoads, entitled "STEGANOGRAPHY METHODS EMPLOYING EMBEDDED CALIBRATION DATA"), describes a way of combining N random images, each random image comprising a single bit of information, to form a composite image that is added to the photo. When it is desired to retrieve the hidden information, each of the N random images is correlated with the photo, the polarity of the resultant correlation determining the specific bit value.

The algorithm described in U.S. Ser. No. 08/848,112, filed Apr. 28, 1997, Honsinger, et al., entitled "AN IMPROVED CARRIER FOR THE DATA EMBEDDING PROBLEM," has been demonstrated to be robust to printing, scanning, and wear and tear while carrying up to 160 bits of information. Such application is hereby incorporated herein by reference. The algorithm has an advantage over Rhoads in that only one correlation needs to be performed making the prospect of fast processing more obtainable. It is also to be noted that the output from the SHA is also 160 bits.

This Honsinger, et al. application also prescribes a means to produce a carrier (random image) with optimal information carrying capacity and robustness. In such applications, the method is taught for embedding a message into a digitized image comprising the steps of forming a digitized version of the desired message; generating a random phase carrier; convolving the formed digitized version of the desired message and the generated random phase carrier to form a scrambled message; and combining the scrambled message with the digitized image to form an embedded message image. The improved carrier signal taught in the Honsinger, et al. application is designed in the Fourier frequency domain. In the Fourier domain, the value of the signal at each frequency is characterized by a complex number that can be represented as either a real/imaginary pair or as an amplitude/phase pair. The carrier signal was designed in Fourier domain in such a way that the carrier's amplitude at each frequency is a constant and the carrier's phase in each frequency is a random number that is uniformly distributed between 0 and 360 degrees. The autocorrelation of such a carrier signal has a shape resembling a delta function, which improves the integrity of the recovered message. The random phase of the carrier is constructed by using the output of a stream cipher encryption system. As a result, it will be practically impossible for any unauthorized person who does not have access to the private key of the encryption system to duplicate the carrier function. Central to the specification of this carrier, is the use of a seed to generate certain random characteristics of the carrier. In the present invention, it is understood that the seed may be derived directly from the machine-readable information or from the SHA of the machine-readable information. This renders the required information capacity of the embedding algorithm to only one bit, since at the time that the machine-readable information is read, it would be possible to regenerate the carrier used at the time of the original embedding. If however, there is a requirement to embed further information not available on the machine readable code, it is appreciated that a carrier derived from using the machine readable information as a seed could be used to carry this information as well, in a multi-bit scenario.

If a transaction card is presented for authorization, then two types of errors could occur; a valid card is rejected, i.e. a false negative, or a invalid card is accepted, i.e., a false positive. In an ideal situation the false negative and false positive rates are zero, but this is impractical. However, an acceptable level of false positives and false negatives are predetermined and these levels are then used to ascertain the number of bits which need to agree in order for a transaction card to be accepted. In the case of a valid card,.the embedded data can be recovered, but some small percentage of the recovered bits will be in error, i.e., the bit error rate.

It is well known, that given a bit error rate and the number of bits in the recovered data string, what the probability distribution of a string having a specified number of bits in error. Indeed, this is done by a Poisson distribution, (see William Feller, *An Introduction to Probability, Theory and Its Applications*, John Wiley & Sons, New York, 1976, pp. 153–159). Thus, once an acceptable false positive rate is known, the bit-error rate and the number of bits in the recovered data, the number of bits which must agree can be readily determined. As an example, if the bit-error-rate is 0.01 and 160 bits are recovered, then every millionth card would have more than 11 bits in error, and 149 bits correct, i.e., 93% of the bits are correct.

In the case of a fraudulent card being presented to the system, there needs to be an acceptable level of such cards being accepted, though that level might be quite small. In this case, the bit error rate is likely to be 0.5 linkage of the data embedded in the printed area, and the data in the machine readable area is not explicitly known. In this case, the probability distribution of strings of n-bits having m-bits in error is approximated by a Gaussian distribution. This is well known in the field of probability, (see William Feller, *An Introduction to Probability, Theory and Its Applications*, John Wiley & Sons, New York, 1976, pp. 179–182). Thus, it is easy to determine the probability that a random bit string will be accepted, given the number of bits required to be in agreement. Using the example above, the likelihood of a false positive is less than 1 in $10^{27}$, a very small number.

Thus, the number of bits needed to be in agreement between the recovered embedded data and the data derived from the machine readable data has to be large enough for the false positive rate to be acceptable and small enough that the false negative rate be acceptable. This is not a major hurdle though, as practical implementations will have sufficiently small bit error rates and a sufficiently large number of bits to assure compliance.

As an alternative, since the characteristics of the errors incurred in this type of application are likely predictable, the information is well suited for encoding using EDAC (Error Detection and Correction) techniques. An example of such codes are the celebrated Reed-Solomon codes which are widely used in many applications. EDAC provides an efficient means to recover actual information despite obscuration due to noise. Often, EDAC may be employed requiring only a fractional amount of data overhead, (see Elwyn R. Berlekamp, *Algebraic Coding Theory*, Aegean Park Press, 1984, ISBN: 0-89412-063-8). Some of the bits are used to perform the EDAC and so the number of bits derived from the machine readable area has to be reduced in order to accommodate the EDAC bits.

A higher level of security is needed for personal identification related documents such as transaction cards in order to reduce fraudulent use of such documents including activities such as skimming. Skimming is the practice of copying the machine readable data from one card to another. In addition, it is preferable if the security features of such personal identification related documents eliminate the need for a clerk to verify the authenticity of a card by looking at an image or card protection feature. Further, it would be beneficial if a personal identification related document and reader system with increased security features works with established transaction card procedures, such as the card validation value (CVV) by having the CVV as part of the data to be hashed, and for image verification values. The prior art fails to teach a personal identification related document and reader system that includes these features.

SUMMARY OF THE INVENTION

It is therefore an object of the present invention to provide a personal identification related document such as transaction card and reader system which reduces fraudulent use of such documents.

It is a further object of the present invention to provide a personal identification related document and reader system with increased security features which work with established transaction card procedures.

Still another object of the present invention is to provide a personal identification related document (such as transaction card) and reader system which eliminates the need for a clerk to verify the authenticity of a card by looking at an image or card protection feature.

Still another object of the present invention is to provide a personal identification related document (such as transaction card) and reader system which works with established transaction card procedures, such as the card validation value (CVV) by having the CVV as part of the data to be hashed, and for image verification values.

It is another object of the present invention to provide a personal identification related document (such as transaction card) and reader system which will operate with unattended transaction terminals, such as ATM's and provide high levels of security.

A further object of the present invention is to provide a personal identification related document (such as transaction card) and reader system which links the printed transaction card with the machine readable data section of the card.

Still another object of the present invention is to provide a personal identification related document (such as transaction card) and reader system which includes embedded data which is invisible to a normal viewer.

Briefly stated, the foregoing and numerous other features, objects and advantages of the present invention will become readily apparent upon a reading of the detailed description, claims and drawings set forth herein. These features, objects and advantages are accomplished by providing a personal identification badge having an area which contains machine readable information and also having a printed region having embedded data in the image printed thereon. A method of producing the identification badge, includes the steps of: forming a digital image of the badge holder; generating an array of random numbers using a random number generator that employs a seed value; adding the array of random numbers to the digital image to produce a modified digital image; and printing the modified digital image on the identification badge. The badge is authenticated by scanning the image on the identification badge to produce a recovered digital image; and correlating the array of random numbers with the recovered digital image to produce a validity check of the identification badge.

DETAILED DESCRIPTION OF THE INVENTION

Figure 1:
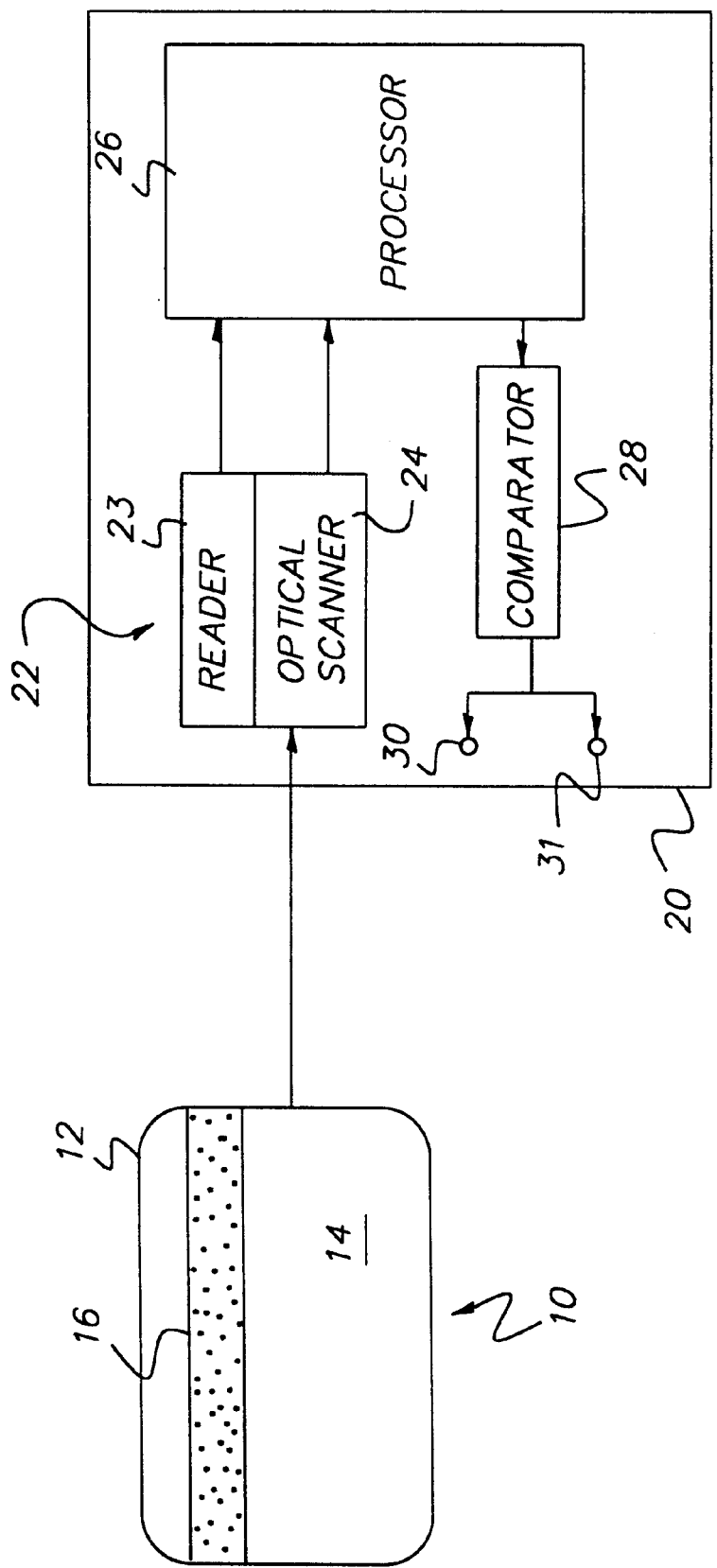
FIG. 1 is a schematic depiction of a personal identification related document in combination with a personal identification related document reader system.

Turning first to FIG. 1, there is shown a personal identification related document 10, depicted by way of example as a transaction card. Transaction card 10 is a generally planar sheet 12 of a material which can be printed upon. Transaction card 10 includes a printable region 14 and an area which contains machine readable data 16. The machine readable data area 16 can be present in several well-known formats, including but not limited to magnetic stripes, integrated circuits, smart-cards, bar codes (both one- and two-dimensional) and data glyphs. The data capacity of these machine readable data areas 16 are relatively small. In the case of a magnetic stripe the data capacity can be on the order of 500 bits. The printable region 14 suitable for printing can be PVC, paper or any other printable material which can be formed to present a planar surface. It is required that the material selected for printable region 14 be able to be printed in such a manner that individual dots or pixels be printed.

Transaction card 10 interfaces with the transaction card reader system 20 of the present invention shown in block diagram form in FIG. 1. The transaction card reader system 20 determines whether the transaction card 10 is legitimate. The transaction card 10 is presented to system 20 in such a manner that both the machine readable area 16 of the transaction card 10 and the printed region 14 are available for inspection by the system 20. The machine readable area 16 of the card is read by a reading device 22 which includes the appropriate reader 23 for the storage means selected, e.g., a magnetic stripe reader in the case of magnetic stripes. Reading device 22 also includes an image scanner 24 to translate the image printed on the printable region 14 into a digital image. The data from the reader 23 and the image scanner 24 are sent to a processor 26. The processor 26 performs a secure hash algorithm on the data captured from the machine readable portion of the transaction card 10. The processor 26 also operates upon the image data acquired from the digitized image on the printable region 14 and extracts the embedded data within the image. The two data streams are passed to a comparator 28 to determine if the two data strings are identical or correspond; that is, to determine if they reach a predetermined level of agreement. If the comparator 28 matches the two data strings, then it alerts the user by turning the indicator light 30 to the "on" state, and if the two strings do not pass the comparator test the decline indicator light 31 is turned to the "on" state.

Figure 2:
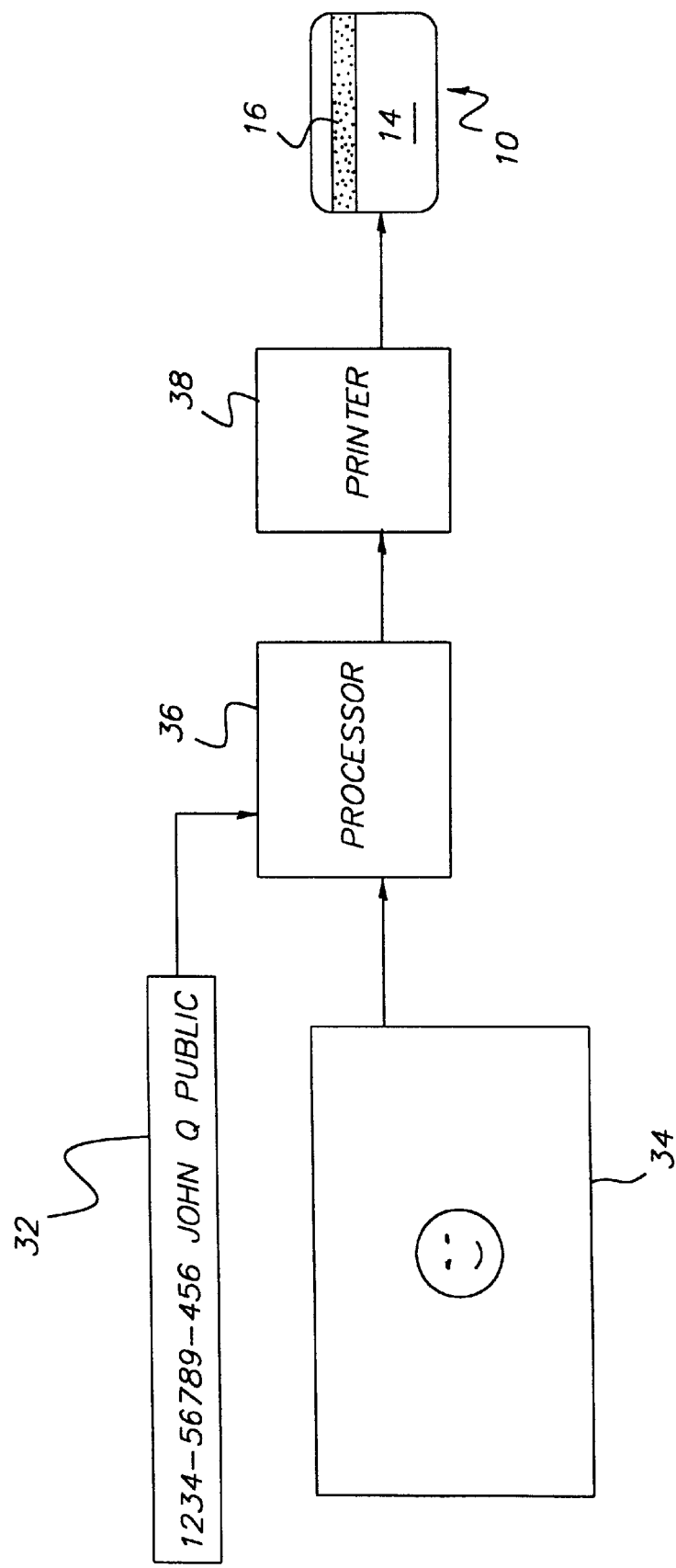
FIG. 2 is a block diagram showing the basic process steps for producing a personal identification related document such as a transaction card.

Referring now to FIG. 2, there is shown a block diagram showing the basic process steps for generating a personal identification related document such as a transaction card 10. In order for the approach described above to operate, one requirement is that a transaction card 10 be produced which has particular features. Such a transaction card 10 contains information 32 important to the card-holder, such as account number, name, etc. The card 10 also must contain printed material, such as a digital image 34 (for example, an image of the card holder), and the image 34 must have embedded data which can be later recovered. The card-holder information 32 is input to a processor 36 where it is applied to a hashing algorithm, such as the Secure Hash Algorithm, and an output bit stream results. The image 34 to be printed is then input to the processor 36 and is modified by a data embedding algorithm in order to store the output from the SHA. The modified image as well as the output from the SHA are then transferred to a transaction card printer 38 where the modified image is printed on the printable region 14 and the card-holder information is written into the machine readable area 16 of the transaction card 10.

Figure 3:
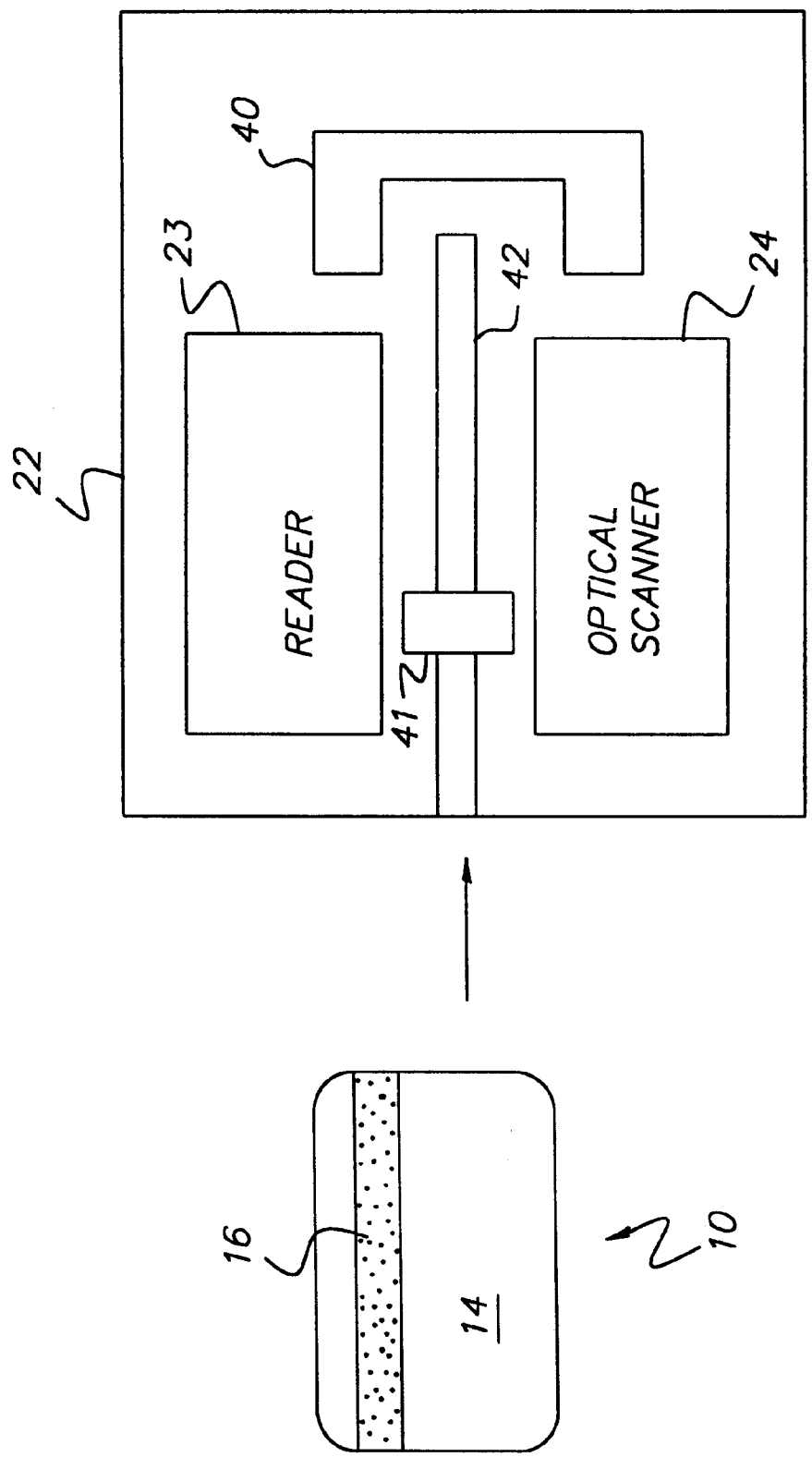
FIG. 3 is a schematic diagram of the reading device of the present invention in combination with a personal identification related document of the present invention.

Looking next at FIG. 3, there is shown a block diagram of the reading device 22. The reading device 22, as mentioned above, includes a reader 23 and an image scanner 24, which has several subsystems. The transaction card 10 when placed into the reader 22 is sensed by a sensor 41 which discerns when a transaction card has been entered into the system. The sensor 41 activates a card transport subsystem 40 which causes the transaction card 10 to be pulled into the reader 22 along a track 42. The sensor 41 activates both the appropriate reader 23, such as a magnetic stripe reader, to commence reading the machine readable area 16 of the transaction card 10, as well as an optical image scanner 24 to scan the printed region 14 of the transaction card 10. The image scanner 24 is capable of sufficient resolution to enable the deciphering of the embedded image information.

While the printed information which includes the embedded information may be any image, there are advantages to having the image being a picture of the card-holder. This provides additional visual information about the legitimacy of the card-holder if a person is conducting the transaction. Additionally, the image of the person can be compressed and the data can be stored in the machine readable area 16 and subsequently used as part of the information stream passing through the SHA. The image information can also be used as a means of transaction card verification with a central transaction card control authority as envisioned by U.S. Pat. No. 5,436,970, Jul. 25, 1995 to Ray, et al., entitled "METHOD AND APPARATUS FOR TRANSACTION CARD VERIFICATION."

In the present invention, it is understood that the seed may be derived directly from the machine-readable information or from the SHA of the machine-readable information. This renders the required information capacity of the embedding algorithm to only one bit, since at the time that the machine-readable information is read, it would be possible to regenerate the carrier used at the time of the original embedding.

Figure 4:
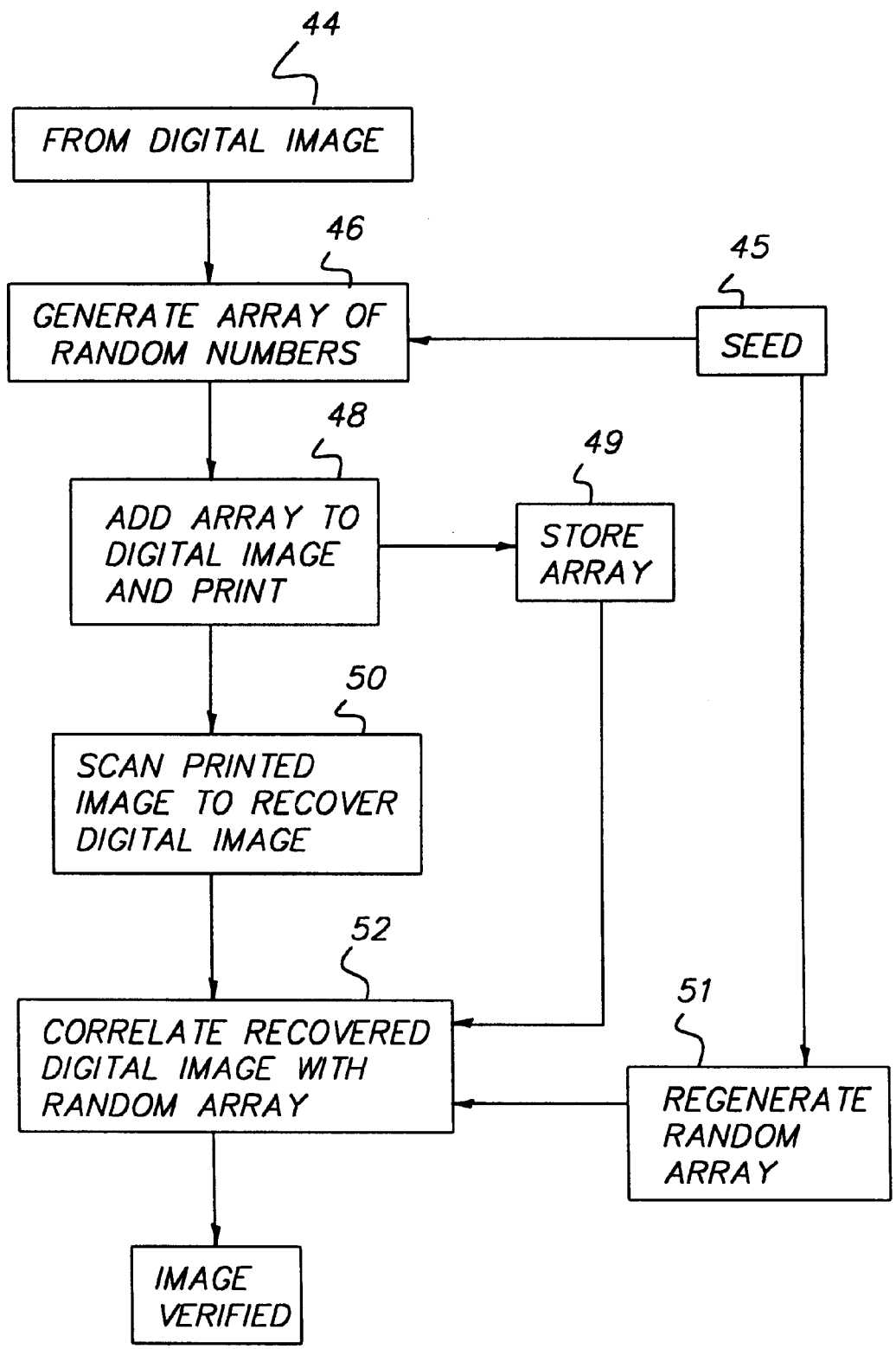
FIG. 4 is a flow chart showing a preferred method of practicing the present invention.

Referring to FIG. 4, according to a preferred embodiment, a digital image of the badge holder is formed 44, for example using a digital camera to form an image having 300×400 pixels. A 512×512 array of random numbers is generated 46 using a seed value 45, such as the badge holders name, a badge serial number, or other unique identifying numbers. The array is generated, for example, using the technique described in U.S. Ser. No. 08/848,112, filed Apr. 28, 1997, by Honsinger, et al., entitled, "AN IMPROVED CARRIER FOR THE DATA EMBEDDING PROBLEM." The first 300×400 array of random numbers from the 512×512 array is added 48 to the digital image to produce a modified digital image, and the modified digital image is printed on the identification badge. The 300×400 array of random numbers may be stored 49 for future use in authenticating the image on the badge. Alternatively, the array of random numbers may be regenerated 51 at a point of authentication using the seed 45 that can be stored on the badge in machine readable form as described above. To authenticate the image, the image is scanned 50 to form a recovered digital image, and the recovered digital image is correlated 52 with the array of random numbers. If the image is authentic the correlation will result in a strong correlation peak. If the image is not authentic, the correlation peak will be weak or non-existent. The simple act of correlating the image with the array of random number has the same effect as extracting a message from the image and comparing the extracted message with the data stored on the card.

From the foregoing, it will be seen that this invention is one well adapted to attain all of the ends and objects hereinabove set forth together with other advantages which are apparent and which are inherent to the process.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not a limiting sense.

Parts List

10 transaction card
12 planar sheet
14 printable region
16 machine readable data
20 transaction card reader system
22 reading device
23 reader
24 optical image scanner
26 processor
28 comparator
30 indicator light
31 decline indicator light
32 information
34 digital image
36 processor
38 transaction card printer
40 card transport subsystem
41 sensor
42 track
44 form digital image step
45 seed
46 generate random number array step
48 add random number array to image step
49 store random number array step
50 scan image step
51 regenerate random number array step
52 correlate recovered digital image with random number array step

What is claimed is:

1. A method of producing an authenticatable identification badge, comprising the steps of:

(a) providing a digital image of a badge holder;

(b) generating an array of random numbers using a random number generator that employs a seed value;

(c) combining the array of random numbers with the digital image to produce a modified digital image;

(d) printing the modified digital image on the identification badge; and (e) recording the seed value on the badge.

2. The method claimed in claim 1, further comprising the steps of:

(a) scanning the modified digital image on the identification badge to produce a recovered digital image;

(b) reading the seed value from the badge;

(c) regenerating the array of random numbers using the random number generator and the seed value that was read from the badge; and (d) correlating the array of random numbers with the recovered digital image to produce a validity check of the identification badge.

3. The method claimed in claim 1, wherein the seed value is an identification code unique to the identification badge holder.

4. The method claimed in claim 3, wherein the seed value includes the badge holder's name.

5. The method claimed in claim 3, wherein the seed value is stored on the identification badge in machine readable form.

6. The method claimed in claim 2, wherein the array of random numbers is regenerated from the seed value.

* * * * *